United States Patent [19]

Levene

[11] 4,255,865

[45] Mar. 17, 1981

[54] CAMBER ALIGNING TOOL

[76] Inventor: Gerald Levene, 125 Berkshire Pl., Irvington, N.J. 07111

[21] Appl. No.: 82,787

[22] Filed: Oct. 9, 1979

[51] Int. Cl.³ .......................................... G01B 5/255
[52] U.S. Cl. .................................. 33/336; 33/203.18; 33/375
[58] Field of Search ..................... 33/203, 203.18, 336, 33/375, 174 E, 203.15, 376

[56] References Cited

U.S. PATENT DOCUMENTS

| | | | |
|---|---|---|---|
| 2,423,317 | 7/1947 | Holton | 33/375 |
| 3,392,454 | 7/1968 | Haley | 33/336 |

FOREIGN PATENT DOCUMENTS 532005  10/1956  Canada ...................................... 33/375

Primary Examiner—William D. Martin, Jr.
Attorney, Agent, or Firm—Weinstein & Sutton

[57] ABSTRACT

A tool for checking the angle of camber of a vehicle wheel which includes a frame, a plurality of upper pin members removable from the frame, a lower pin member mounted on the frame, and indicator means disposed on the frame and providing an indication of whether the angle of camber of the wheel is proper. The upper and lower pin members are of different lengths, and their ends determine a line which forms a predetermined angle with the vertical axis of the tool, which angle corresponds to the angle of camber of a properly-aligned wheel.

12 Claims, 4 Drawing Figures

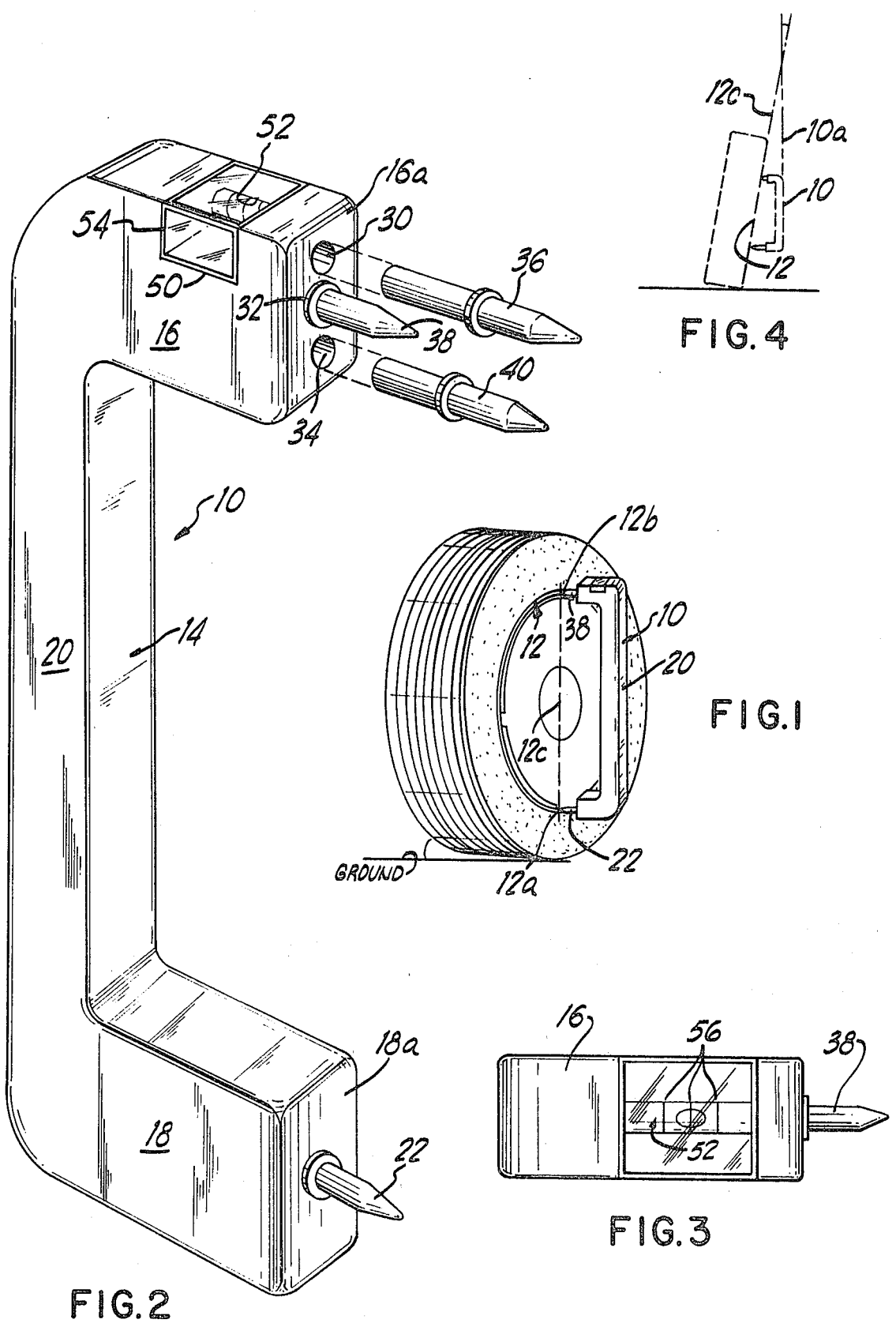

CAMBER ALIGNING TOOL

FIELD OF THE INVENTION

The present invention relates generally to the alignment of wheels on vehicles, and more particularly, to a wheel-alignment device utilizing a liquid level or the like for determining whether the camber of the vehicle wheel is proper or not.

BACKGROUND OF THE INVENTION

The front wheels of a vehicle normally slope outwardly at the top to a slight degree relative to the ground, and this angle of slope of the wheel when resting on the ground is referred to as the angle of camber. If the angle is too large or too small, it will have a tremendous effect on the tire life of the front wheels of the vehicle and on the directional stability of the vehicle. Accordingly, it is of utmost importance to quickly and easily determine if the angle of camber of a vehicle wheel is proper, and if not, to correct it.

Presently, there are a number of complex devices for determining the angle of camber and caster of vehicle wheels and for generally aligning the front end of vehicles. Typically, such apparatus includes a large frame onto which the front wheels of the vehicle are driven. Then the camber and/or caster and/or toe of each of the vehicle wheels is checked and corrected. As will be understood, such devices are large in size, complex, and costly, which results in the aligning process being relatively expensive.

In the past, relatively small tools, of a size that can be carried by hand, have been developed for checking the camber and/or caster of each of the front wheels separately. However, such tools have not been generally satisfactory. More particularly, in some prior art arrangements, the tools must be adjusted to the diameter of the particular wheel. Such adjustments result in built-in inaccuracies during the camber measurement. In addition, in such prior art tools, the tool must be "zeroed" to a reference setting before it can be used to check the camber angle.

Broadly, it is an object of the present invention to provide an improved tool for checking the camber angle of a vehicle wheel which overcomes one or more of the aforesaid drawbacks. Specifically, it is within the contemplation of the present invention to provide an improved camber tool which is small, inexpensive, and easy to employ, and wherein the tool does not require any adjustments or reference settings before it is used.

It is a further object of the present invention to provide an improved camber tool which is completely preset and predetermined for different size vehicle wheels so that the tool does not have to be "zeroed" before use and thereby minimizes the amount of skill and knowledge required by the operator to use the tool.

SUMMARY OF THE INVENTION

Briefly, in accordance with the principles of the present invention, there is provided an improved camber tool for providing an indication of whether the angle of camber of a vehicle wheel is proper. More particularly, the tool includes a frame having an upper first end, a lower second end, and a section between the ends to be grasped by the operator of the tool. The upper first end is provided with a plurality of openings for receiving removable pins, with each of the pins being of different and predetermined lengths for use on vehicle wheels of different diameters. In the preferred embodiment, three openings are formed in the upper end of the tool, and three removable pins are provided and are adapted to be inserted into an associated opening. That is, in the preferred embodiment, the uppermost pin is for use on a 15 inch diameter wheel, the middle pin is for a 14 inch diameter wheel, and the lowermost pin is for a 13 inch diameter wheel. In addition, the lowermost pin is slightly longer than the middle pin, which is slightly longer than the uppermost pin.

In addition, the lower second end of the tool is provided with a lower pin of predetermined length for engaging a lower point on the rim of the wheel. In use, the upper and lower pins of the tool engage upper and lower points on the rim of the vehicle wheel along its vertical center line, and the ends of the pins determine a line which forms an angle relative to the vertical axis of the tool, which angle corresponds to the angle of camber desired. In this manner, as will be explained, even though the vehicle wheel is on a slight angle relative to the ground, when the upper and lower pins engage the rim of a vehicle wheel, the vertical axis of the tool will be perpendicular to the ground if the wheel is at the proper angle of camber. In addition, the tool is provided with level means, such as a bubble level, for providing an indication of whether the angle of camber of the wheel is proper.

In use, the size of the vehicle wheel to be checked is determined, and the appropriate removable pin is selected and inserted into its associated opening in the upper end of the tool. The tool is then grasped by the operator and applied to the rim of the vehicle wheel, such that the vertical axis of the tool is in line with and superimposed on the vertical center line of the vehicle wheel, and such that the upper pin engages the vehicle rim at the uppermost point of the felloe of the rim, and the lower pin engages the vehicle rim at the lowermost point of the felloe of the rim. Once the tool is in proper position, the operator reads the bubble level indicator to determine whether the angle of camber of the wheel is proper. That is, the bubble level is provided with predetermined indicators for reading either 0° camber, or $\frac{1}{4}$° positive camber, or $\frac{1}{2}$° positive camber. The operator merely looks at the bubble level to determine whether the bubble is in line with the required camber angle for that wheel. If it is not, the operator puts down the tool and makes the necessary adjustment to the wheel and then reapplies the tool to the wheel to determine if the camber has been properly adjusted. This process is continued until the bubble level of the tool lines up with the preset indicating mark for indicating the required camber angle of the particular vehicle wheel being checked.

Advantageously, as a result of the present invention, no adjustments or "zeroing" of the tool are required in order to use the tool of the present invention, as the size of the pin members have been predetermined and the location of the pin members on the tool have been preset for use with a corresponding size diameter wheel, to provide an accurate indication of whether the angle of camber is correct for that size wheel.

BRIEF DESCRIPTION OF THE DRAWINGS

Further objects, features, and advantages of the present invention will become apparent upon consideration of the detailed description of the presently preferred embodiment, when taken in conjunction with the accompanying drawings, wherein:

FIG. 1 is a perspective view of the improved camber tool of the present invention applied to a vehicle wheel;

FIG. 2 is a perspective view of the tool shown in FIG. 1;

FIG. 3 is a top plan view of the tool shown in FIG. 1; and

FIG. 4 is a diagrammatic illustration of the tool establishing the angle of camber.

DETAILED DESCRIPTION OF THE PREFERRED EMBODIMENT

Referring now to FIG. 1, there is shown a camber tool embodying the principles of the present invention, generally designated by the reference numeral 10. In addition, the tool 10 is shown applied to the rim 12 of a vehicle wheel to determine whether or not its angle of camber is proper. The tool 10 includes a frame 14 having an upper end 16, a lower end 18, and an intermediate section 20 adapted to be grasped by the operator of the tool. The lower end 18 of the tool includes a surface 18a which is provided with a pin 22 which is fixed in position on the lower end of the tool. Pin 22 is of a predetermined length, preferably 1.1265 inches, and is adapted to engage the lower point 12a on the felloe of the rim 12 of the vehicle wheel, in a manner to be explained.

The upper end 16 of the tool includes a surface 16a which is provided with three openings 30, 32, and 34 for receiving respective removable pins 36, 38, and 40 for engaging the upper point 12b on the felloe of the rim 12. Each of the pins is of a different predetermined length so that when inserted into its respective hole within the tool, the length which projects from the surface 16a of the tool will be different. In the preferred embodiment, the projecting length of pin 36 is 0.9913 inches and is predetermined for a 15 inch diameter wheel. The projecting length of pin 38 is 1 inch and is for use with a 14 inch diameter wheel. Last, the projecting length of pin 40 is 1.0087 inches and is predetermined for use with a 13 inch diameter wheel. As will be understood, since the bottom of the wheel slopes outwardly at the top a slight degree relative to the ground, the lower pin 40 must be the longest in order to engage the wheel rim and maintain the tool in a vertical orientation relative to the ground. However, the upper pin 36 does not have to be as long in order to maintain the tool 10 in its vertical orientation relative to the ground. It is also noted that the lengths of the upper pins 36, 38, and 40 and the lower pin 22 have been predetermined and prepositioned, such that the ends of the pins determine a line which forms an angle relative to the vertical axis 10a of the tool, with the angle corresponding to the desired camber angle. Since the majority of vehicles utilizing camber adjusting systems have a $\frac{1}{2}°$ angle of camber, in the preferred embodiment of the present invention, the lengths and positions of the pins have been predetermined such that the ends of the pins determine a line which forms an angle of $\frac{1}{2}°$ relative to the vertical axis of the tool. In use, when an upper pin is selected and is inserted into its respective hole and the tool is placed against the wheel of the vehicle, with the upper pin engaging the upper end of the wheel rim and the lower pin 22 engaging the lower end of the wheel rim, the vertical axis 10a of the tool 10 will be vertical and perpendicular to the ground if the angle of camber of the wheel is $\frac{1}{2}°$.

As also shown in the drawings, the tool 10 is provided with a recess 50 for receiving therein a bubble vial 52 which is adapted to be mounted in the tool 10 in any suitable manner. For example, a U-shaped frame 54 may be employed and disposed within the recess 50, with the vial or liquid level 52 being mounted on the U-shaped frame 54. As will be noted, the upper surface of the vial 52 is provided with three markings 56. The first mark is calibrated such that when the bubble lines up with it, it corresponds to a camber angle of $\frac{1}{2}°$ positive. Similarly, the second mark 56 is calibrated such that when the bubble lines up with it, it indicates a camber angle of $\frac{1}{4}°$ positive. Lastly, the third marking 56 is calibrated such that when the bubble lines up with it, the camber angle is 0°. As will be understood, as the vertical axis 10a of the tool is perpendicular to the ground when the wheel is at a $\frac{1}{2}°$ angle of camber, then when the wheel is at a $\frac{1}{4}°$ angle of camber, the vertical axis will be rotated a $\frac{1}{4}°$ relative to the ground, and similarly, the vertical axis will be rotated a $\frac{1}{2}°$ relative to the ground when the wheel is at an angle of 0° camber. However, the indicator marks 56 for 0° and $\frac{1}{4}°$ camber angles have been calibrated to compensate for this shift in the vertical axis of the tool.

Accordingly, the tool of the present invention does not have to be preadjusted or "zeroed" before it is used. It is merely necessary to determine the diameter of the vehicle wheel to be checked, and then to select the appropriate pin 36, 38, or 40 and insert it into its corresponding hole 30, 32, or 34 in surface 16a of the tool. The projecting length of the selected pin has been predetermined, and the location of the holes 30, 32, and 34 has been preset for the particular diameter wheel, such that the vertical axis 10a of the tool 10 will be perpendicular to the ground when the tool is applied to the wheel 12 and the wheel is at an angle of camber of $\frac{1}{2}°$. In addition, the tool 10 is applied to the rim 12 such that the vertical axis 10a of the tool is in line with and superimposed on the vertical center line 12c of the rim 12 when viewed from the outer side of the wheel. This is accomplished by positioning the selected upper pin 36, 38, or 40 and the lower pin 22 in alignment with the vertical center line 12c of the rim 12. In this manner, the tool 10 is automatically vertically aligned within a few degrees which will not affect the accuracy of the readings obtained. Of course, as an alternative embodiment, the present invention envisions the use of a second bubble level mounted on the frame 14 of tool 10 to accurately indicate that the tool 10 is vertically aligned.

Once the tool is applied to the wheel, such that the upper and lower pins are in engagement with the upper and lower points of the vehicle wheel, the operator reads the bubble indicator 52 to determine if the bubble is in line with the marking 56 which indicates the proper angle of camber for that wheel. If not, the camber of the wheel is adjusted, and the operator then reapplies the tool to the wheel, and takes another reading to see if the bubble 56 is in line with the required marking. If not, the process is repeated until the tool 10 indicates that the wheel 12 has been adjusted to its proper angle of camber.

It should also be noted that the present invention envisions the use of other types of indicator means, other than bubble vials. For example, frame 14 of tool 10 may be provided with a concave trackway and ball arrangement, such that the low spot of the trackway is at the center of the trackway, with the ball moving relative to this trackway to indicate whether the angle of camber of the wheel is proper.

Also, instead of the pins being different, predetermined lengths, they can be made uniform in length, and the depth of the holes can be made different, so that the pins will still project the required lengths. In addition, the pins can be attached to the tool in any other suitable manner, such as by clamps or the like.

Advantageously, as a result of the present invention, there has been provided an improved tool which includes removable pins 36, 38, and 40 of predetermined lengths for use with particular diameter wheels so as to provide a predetermined orientation of the tool when it is employed, so that the tool does not have to be adjusted or "zeroed" before it is used. Accordingly, the present invention has provided an inexpensive tool which is simple to use and which requires a minimum of operations.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A tool for checking the angle of camber of a vehicle wheel, comprising:
a frame, first means on said frame for engaging a first point on the rim of a vehicle wheel, said first engaging means including a plurality of upper pin members, means for attaching each of said upper pin members to said frame so that a first predetermined length of one of said upper pin members projects from said tool, second means on said frame spaced from said first means for engaging a second point on the rim of said vehicle wheel, the ends of said first and second engaging means determining a line which forms a predetermined angle with the vertical axis of said tool, said predetermined angle corresponding to the angle of camber of a properly-aligned wheel, and indicator means disposed on said frame for providing an indication of whether the angle of camber of said wheel is proper.

2. A tool in accordance with claim 1 wherein said first engaging means and said second engaging means have a predetermined spacing.

3. A tool in accordance with claim 1 wherein said second engaging means include a lower pin member mounted on said tool, said lower pin member being of a second predetermined length different from the first predetermined lengths of said upper pin members.

4. A tool in accordance with claim 1 wherein said attaching means include a plurality of holes formed in said frame for receiving said plurality of upper pin members.

5. A tool in accordance with claim 1 wherein said attaching means include clamps for attaching said upper pin members to said tool.

6. A tool in accordance with claim 1 wherein said indicator means include a bubble level disposed on said frame for providing an indication of the angle of camber.

7. A tool in accordance with claim 1 wherein said frame includes a section for holding said tool in position against a vehicle wheel.

8. A tool for checking the angle of camber of a vehicle wheel, comprising:
a frame having first and second ends, said first end including first means for engaging the rim of a vehicle wheel at a first point, said second end including second means for engaging the rim of said vehicle wheel at a second point spaced from said first point, said first and second engaging means being of different predetermined lengths, said first engaging means including a plurality of upper pin members, means for attaching each of said upper pin members to said frame so that a first predetermined length of one of said upper pin members projects from said tool, and indicator means disposed on said frame for providing an indication of whether the angle of camber of said wheel is proper.

9. A tool for checking the angle of camber of a vehicle wheel, comprising:
a frame having first and second ends and an intermediate section for holding said tool;
a plurality of removable upper pin members;
means for attaching each of said upper pin members to a first end of said frame so that a first predetermined length of said attached upper pin member projects from the first end of said tool;
a lower pin member on said second end of said tool having a second predetermined length projecting from the second end of said tool different from said first predetermined length; and
indicator means disposed on said frame for providing an indication of whether the angle of camber of said wheel is proper.

10. A tool in accordance with claim 9 wherein said attaching means include a plurality of holes formed in said frame for receiving said plurality of upper pin members.

11. A method of checking the angle of camber of a wheel employing a tool having a plurality of upper pin members and a lower pin member projecting from said tool, and indicating means, comprising the steps of:
selecting one of a plurality of said upper pin members;
positioning said selected upper pin member at a predetermined position on said tool, such that said upper pin member has a predetermined projecting length relative to the projecting length of the lower pin member and relative to the vertical axis of the tool;
applying said tool to said vehicle wheel such that the vertical axis of the tool overlies the vertical center line of the wheel and such that said upper pin member is in engagement with an upper end of the vehicle wheel and said lower pin member is in engagement with a lower end of said vehicle wheel; and
reading said indicating means to determine whether the angle of camber of said wheel is proper.

12. A method in accordance with claim 11 wherein said tool includes a plurality of upper pin members and a plurality of holes formed in said tool associated with corresponding upper pin members for receiving said upper pin members, further including the step of selecting one of said upper pin members corresponding to the diameter of the vehicle wheel being checked, and inserting said selected upper pin member in an associated hole on said tool.

* * * * *